(12) United States Patent
Sarshar et al.

(10) Patent No.: US 8,317,904 B2
(45) Date of Patent: Nov. 27, 2012

(54) SAND SEPARATION SYSTEM AND METHOD

(75) Inventors: Mir Mahmood Sarshar, Beaconsfield (GB); Mirza Najam Ali Beg, Milton Keynes (GB); Carl Wordsworth, Bedford (GB)

(73) Assignee: Caltec Limited (GB)

( * ) Notice: Subject to any disclaimer, the term of this patent is extended or adjusted under 35 U.S.C. 154(b) by 180 days.

(21) Appl. No.: 12/863,658

(22) PCT Filed: Jan. 5, 2009

(86) PCT No.: PCT/GB2009/000014
§ 371 (c)(1),
(2), (4) Date: Oct. 15, 2010

(87) PCT Pub. No.: WO2009/092997
PCT Pub. Date: Jul. 30, 2009

(65) Prior Publication Data
US 2011/0036239 A1 Feb. 17, 2011

(30) Foreign Application Priority Data
Jan. 22, 2008 (GB) .................................. 0801044.9

(51) Int. Cl.
*B01D 19/00* (2006.01)

(52) U.S. Cl. ................. 95/259; 95/261; 96/210; 96/212

(58) Field of Classification Search ............... 95/259, 95/261; 96/210, 212
See application file for complete search history.

(56) References Cited

U.S. PATENT DOCUMENTS

| 3,704,567 | A | * | 12/1972 | Engel ................................ 95/19 |
| 3,764,008 | A |   | 10/1973 | Darley et al. |
| 4,414,112 | A |   | 11/1983 | Simpson et al. |
| 4,666,471 | A | * | 5/1987  | Cates ............................... 95/262 |
| 4,948,393 | A | * | 8/1990  | Hodson et al. ................... 95/250 |
| 6,132,494 | A |   | 10/2000 | Kjos et al. |
| 6,269,880 | B1 |  | 8/2001  | Landry |
| 6,656,251 | B1 | * | 12/2003 | Claesson et al. ................. 95/253 |
| 2003/0168391 | A1 | * | 9/2003 | Tveiten ........................ 210/188 |
| 2005/0115273 | A1 |   | 6/2005 | Bakker et al. |
| 2007/0209971 | A1 |   | 9/2007 | Duyvesteyn et al. |

FOREIGN PATENT DOCUMENTS

EP 1 180 400 2/2002
(Continued)

OTHER PUBLICATIONS

Notification of Co-Pending U.S. Appl. No. 12/863,703.
(Continued)

*Primary Examiner* — Duane Smith
*Assistant Examiner* — Douglas Theisen
(74) *Attorney, Agent, or Firm* — Fay Sharpe LLP

(57) ABSTRACT

A sand separation system includes a first separator (2) that is constructed and arranged to receive a first mixture of gas, sand and liquid, and separate gas at least partially from the first mixture to leave a second mixture of sand and liquid. A second separator (22) comprising a uniaxial cyclonic separator is constructed and arranged to receive the second mixture and separate liquid at least partially from the second mixture to leave a third mixture of sand and liquid. A third separator (34) comprising a gravity separator is constructed and arranged to receive the third mixture and separate liquid at least partially from the third mixture.

21 Claims, 2 Drawing Sheets

FOREIGN PATENT DOCUMENTS

| | | |
|---|---|---|
| GB | 2 258 167 | 2/1993 |
| GB | 2 394 737 | 2/2006 |
| GB | 2 440 726 | 2/2008 |
| WO | WO 97/07868 | 3/1997 |
| WO | WO 01/83075 | 11/2001 |
| WO | WO 01/87453 | 11/2001 |
| WO | WO 2004/026486 | 4/2004 |
| WO | WO 2005/094962 | 10/2005 |
| WO | WO 2007/001174 | 1/2007 |

OTHER PUBLICATIONS

British Search Report dated May 19, 2008 for Application No. GB0801044.9.
International Search Report mailed Jul. 15, 2010 for International application No. PCT/GB2009/000014.

* cited by examiner

SAND SEPARATION SYSTEM AND METHOD

This invention relates to a sand separation system for separating sand from a fluid, and a method of separating sand from a fluid. In particular, but not exclusively, it relates to a system for separating sand from oil or an oil-containing fluid, and a method thereof.

Production of sand from oil and gas wells causes a number of problems for the operators of the wells. The problems include:
- erosion of pipelines and equipment within the production and process system;
- damage to equipment such as pumps or systems with moving parts or seals;
- build-up of sand in gravity separators, affecting their performance and demanding regular maintenance;
- high cost to upgrade materials exposed to sand in order to minimize erosion;
- restricted production from wells that produce excessive sand, thus causing a loss of revenue;
- blockage of the pipelines, leading to loss of pressure and requiring other maintenance work such as pigging to clean the lines.

The operators of oil and gas fields require reliable systems that can remove sand effectively upstream of the process and production system to eliminate the above listed problems.

There are a number of sand separation systems available in the market to remove sand. Most of these are cyclonic-separation systems and include reverse flow hydrocyclones, which generate high "g" forces to separate sand from the produced gas and liquid phases. Some of the features of the known cyclonic sand separation systems affect the efficiency of sand separation significantly.

Reverse flow hydrocyclones are well known in the industry and are used for performing a variety of phase separation duties. They have a steep inverted cone shape with a tangential entry vent. The tangential entry vent causes spinning of the fluid mixture and generates high "g" forces. The design of the hydrocyclones is such that the low and high density phases are separated as a result of the spinning action and the generation of high "g" forces. The low density phase is forced upwards and exits the hydrocyclone through a vortex finder located in the top section of the unit, and the high density phase exits from the bottom of the unit. The two phases (low and high density) therefore move in opposite directions and it is for this reason that hydrocyclones are referred to as reverse flow cyclones.

Produced oil and gas usually consists of oil, gas and often some water, which is mixed with oil. The combination of gas and liquid phases flowing through pipelines generates fluctuations in the flow rate of each phase, known as flow regime. There are a variety of flow regimes such as slugging, semi-slug, dispersed flow, stratified, wavy etc. The main characteristics of these flow regimes are that the instantaneous flow rate of each phase flowing through any part of the pipeline varies significantly. These flow fluctuations seriously affect the performance of hydrocyclones and reduce their efficiency.

A further problem associated with most cyclonic sand separation systems is that as the separation of sand from the mixture of liquid, gas and sand is carried out in a single step, the liquids and gases are forced to flow upwards and exit from the top outlet of the hydrocyclone, while only the sand flows downwards into a collection vessel located below the hydrocyclone. The reverse flow of the liquid phase against the downwards flowing sand results in a significant quantity of sand being carried up with the liquid phase instead of being deposited in the collection vessel. Changes in flow regime can add to this effect. The carry over of sand prevents complete separation of the sand and thus the problems associated with sand production are neither eliminated nor even significantly reduced.

It is an object of the present invention to provide a sand separation system that mitigates at least some of the aforesaid disadvantages.

According to the present invention there is provided a sand separation system including:
a first separator that is constructed and arranged to receive a first mixture of gas, sand and liquid, and separate gas at least partially from the first mixture to leave a second mixture of sand and liquid,
a second separator comprising a uniaxial cyclonic separator that is constructed and arranged to receive the second mixture and separate liquid at least partially from the second mixture to leave a third mixture of sand and liquid,
and a third separator comprising a gravity separator that is constructed and arranged to receive the third mixture and separate liquid from the third mixture, and store the collected sand.

In a system for removing sand from the fluids produced by oil and gas wells, the liquid may include oil or a mixture of oil and water. The mixture of sand and liquid leaving the first separator may include a small quantity of gas, although most of the gas is removed by the first separator.

Removing gas from the first mixture of gas, sand and liquid significantly reduces fluctuations in the flow regime and variations in the flow rate of the fluids entering the uniaxial cyclonic second separator. This greatly improves the efficiency of separation achieved by the cyclonic separator and reduces the carry over of sand in the separated liquid. The uniaxial cyclonic second separator is arranged such that the bulk of the liquid is separated from the sand, while a small volume of liquid exits with the sand as a carrier in a sand/liquid slurry. This ensures smooth flow of the sand/liquid slurry and also helps to ensure that the separated liquid is virtually free of sand. The gravity separator subsequently removes a large proportion of the liquid from the sand/liquid slurry and collects the sand for disposal at intervals.

The separated liquid is virtually free of sand particles larger than about 20 microns. This greatly reduces erosion of downstream transportation and processing installations and reduces maintenance and repair costs. Blockage of downstream systems is also prevented. The separation system also allows improved production from oil and gas wells that produce fluids with a high sand content, thereby providing increased revenue. The separated sand has a low oil content and can be collected in containers and removed for cleaning and disposal off-site.

The first separator may be a cyclonic separator and is preferably a uniaxial cyclonic separator, which is compact and reliable, and provides a high degree of separation efficiency. However, other types of separate may also be used, including for example gravity separators.

Advantageously, the uniaxial cyclonic second separator has an inlet chamber, a separation chamber, a first outlet chamber for the separated liquid and a second outlet chamber for the sand/liquid mixture. The inlet chamber and the outlet chambers are preferably involute in shape. We have found that uniaxial cyclonic separators of this type are considerably more efficient than reverse flow cyclonic separators such as hydrocyclones, providing negligible carry over of sand in the separated liquid. They also produce very little pressure drop in the produced fluids.

Advantageously, the third separator includes a separation chamber having an inlet for the third mixture, an upper outlet for liquid and a lower outlet for sand disposal, and a dividing wall in an upper part of the separation chamber, between the inlet and the upper outlet. This arrangement allows most of the sand particles to settle out of the liquid and collect in the lower part of the vessel. Only the finest sand particles (for example, those smaller than 20 microns) are able to remain suspended within the separated liquid. As those particles cause little erosion and do not settle in flowing liquid, their presence is tolerable.

The third separator is preferably located below the second separator, allowing the sand/liquid mixture to flow under gravity into the third separator, without any significant risk of causing a blockage.

The third separator may include a sand level detector, to indicate when it needs to be emptied.

Advantageously, the sand separation system includes means for isolating, depressurising and emptying the third separator, so that it can be emptied without affecting other parts of the separation system.

The sand separation system preferably includes a plurality of third separators that are constructed and arranged to receive the third mixture alternately. This allows the separation to be operated continuously, with one gravity separator remaining operational while another is emptied.

According to another aspect of the invention there is provided a method of separating sand from a first mixture of sand, gas and liquid, the method including separating gas at least partially from the first mixture to leave a second mixture of sand and liquid, separating liquid at least partially from the second mixture by cyclonic action to leave a third mixture of sand and liquid, and separating liquid at least partially by gravity separation from the third mixture.

The method preferably includes separating gas from the first mixture in a uniaxial cyclonic separator.

Preferably, the method includes separating liquid from the second mixture in a uniaxial cyclonic separator.

Advantageously, the third mixture is delivered alternately to a plurality of third separators. The method preferably includes isolating, depressurising and emptying each third separator between deliveries.

An embodiment of the invention will now be described by way of example, with reference to the accompanying drawings, in which:

FIG. 1 shows a sand separation system for separating sand from a sand/gas/liquid mixture, for example the produced fluids of an oil well. The produced fluids include oil and may also include some liquid water, in which case a further separation system (not shown) may be provided to separate the oil from the water.

The system includes a first separator 2 for separating gas from the sand/gas/liquid mixture. The first separator has a first inlet 4 for receiving the sand/gas/liquid mixture, a first outlet 6 for separated gas and a second outlet 8 for the separated sand/liquid mixture. The sand/liquid mixture may retain a small quantity of gas, but the bulk of the gas will have been removed by the first separator 2.

The first separator 2 is preferably a cyclonic separator and may for example be a uniaxial cyclonic separator similar to that described in GB0616101.2, the content of which is incorporated by reference herein. Alternatively, the first separator 2 may for example be a gravity separator.

Figure 1:
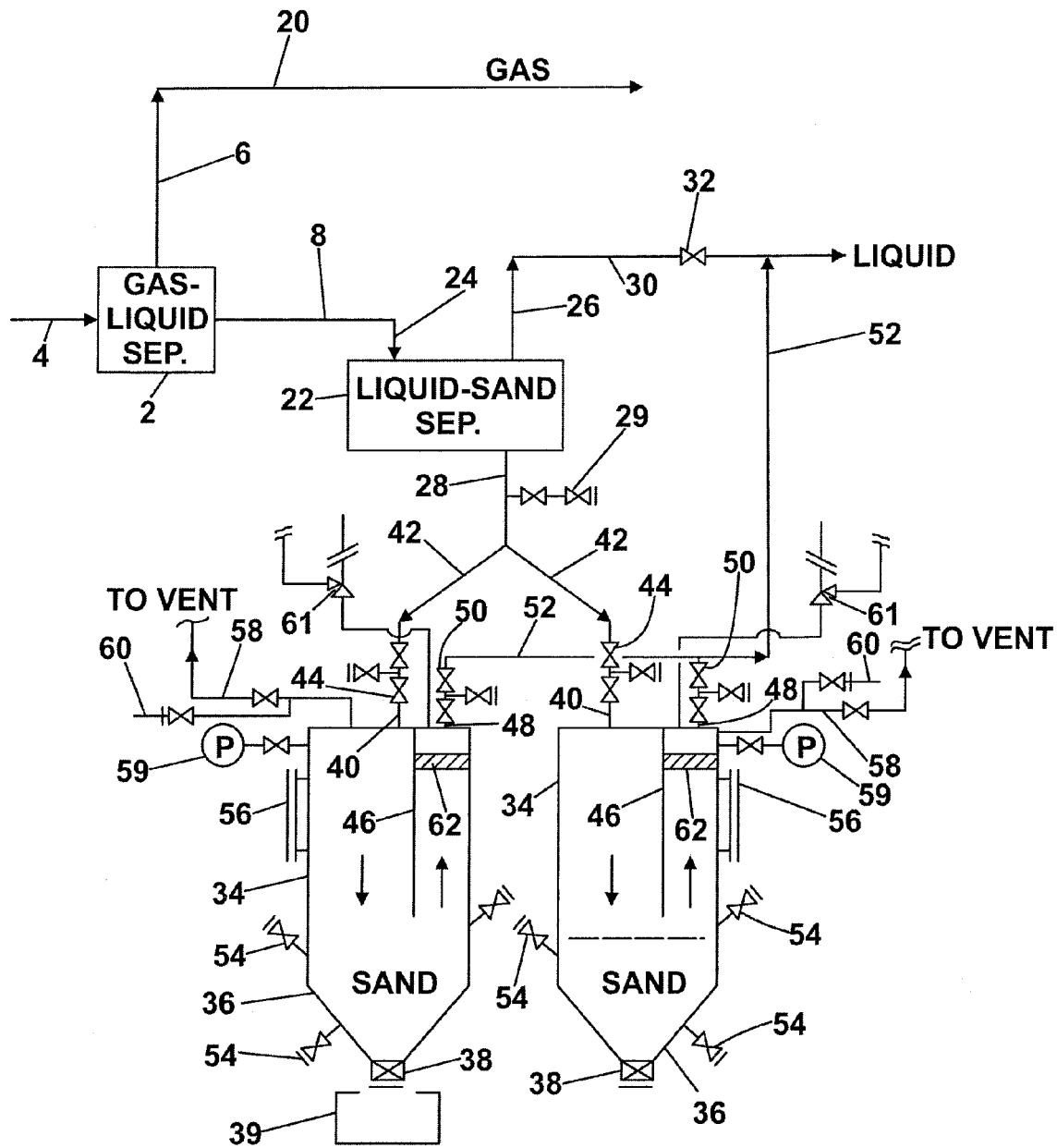
FIG. 1 is a schematic view of a sand separation system for removing sand from a sand/gas/liquid mixture.
Figure 2:
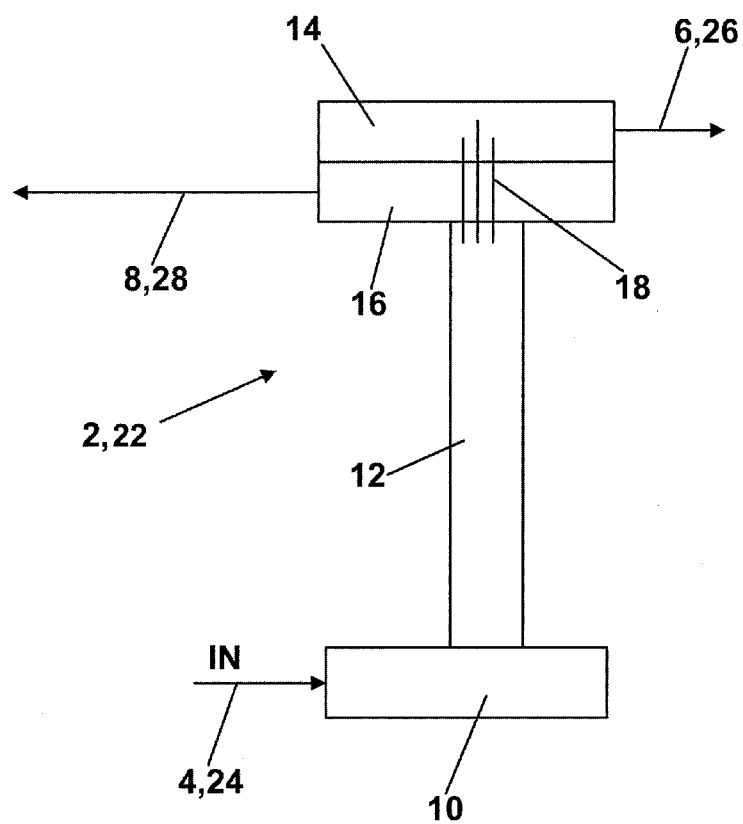
FIG. 2 is a side view of a uniaxial cyclonic separator.

In this embodiment, the first separator 2 is a uniaxial cyclonic separator, an example of which is shown in FIG. 2. The separator 2 includes an inlet chamber 10, a separation chamber 12, a first outlet chamber 14 for gas and a second outlet chamber 16 for the sand/liquid mixture. The inlet chamber 10 and the outlet chambers 14,16 are preferably involute in shape, the inlet vent 4 and the first and second outlet vents 6,8 being substantially tangential to the respective chambers. The separation chamber 12 is elongate and may be of substantially uniform cross-section, or it may contain a narrow throat portion similar to that of the uniaxial cyclonic separator described in GB0616101.2.

The fluids entering the uniaxial cyclonic separator 2 through the first inlet vent 4 are caused to swirl around the axis of the separation chamber by the involute shape of the inlet chamber 10. This swirling motion generates a high "g" force, which causes the fluids to separate by cyclonic action. The dense sand/liquid mixture moves radially outwards and exits through the second outlet chamber 16 and the second outlet vent 8. The gas, being less dense, is forced radially inwards and flows into the first outlet chamber 14 through a vortex finder 18, from where it exits through the first outlet 6. The involute shapes of the first and second outlet chambers 14,16 restore the pressure of the exiting fluids, so that the pressure drop across the cyclonic separator 2 is minimal.

The separated gas flows from the first outlet 6 into a gas line 20, from where it may be transported, used, stored or flared. The separated sand/liquid mixture is delivered from the second outlet 8 to a second separator 22 for separating the bulk of the liquid from the sand/liquid mixture, to leave a sand/liquid slurry. The second separator 22 is a uniaxial cyclonic separator having a second inlet 24 for receiving the sand/liquid mixture, a third outlet 26 for separated liquid and a fourth outlet 28 for the sand/liquid slurry.

The uniaxial cyclonic second separator 22 is preferably of the type shown in FIG. 2, having an inlet chamber 10, a separation chamber 12, a first outlet chamber 14 for liquid and a second outlet chamber 16 for the sand/liquid slurry. The inlet chamber and the outlet chambers are involute in shape, the inlet vent 24 and the first and second outlet vents 26,28 being substantially tangential to the respective chambers.

In use, the sand/liquid mixture is subjected to cyclonic action within the separation chamber. The sand, being dense, moves radially outwards and exits with a small quantity of liquid as the carrier through the second outlet 28 in the form of a sand/liquid slurry, the rate of flow through the second outlet being controlled by a tuning valve 29. The bulk of the liquid is forced radially inwards and exits through the first outlet 26 into a liquid outlet line 30, from where it may be transported or stored. The flow of liquid through the outlet line 30 is controlled by an adjustable tuning valve 32. The tuning valves 29,30 are adjusted such that most of the liquid is guided through the first outlet 26 and the small remaining volume of liquid exits through the second outlet 28, together with virtually all the sand. This ensures that the liquid flowing into the outlet line 30 is substantially free of sand. The small quantity of liquid remaining in the sand/liquid slurry serves as a carrier, ensuring that the sand flows smoothly through the second outlet 28 without any risk of blocking.

Located below the second cyclonic separator 22 are two identical gravity separators 34. Each gravity separator 34 comprises a vertical cylindrical vessel having a conical portion 36 at its lower end, which leads to an outlet vent 38 for removal of separated sand. The outlet vent 38 includes a pinch valve (not shown), which is designed to prevent the vent becoming blocked by sand collecting within the gravity separator, and an isolation blind flange (not shown) below the pinch valve, which provides full isolation and prevents leakage when the vessel is operating under pressure. A sand container 39 may be positioned below the outlet vents 38 to receive separated sand when emptying the gravity separators 34.

An inlet vent 40 for sand/liquid slurry is provided in the upper part of the vessel. The second outlet 28 of the second cyclonic separator 22 is connected through branched delivery lines 42 and respective valve sets 44 to the inlet vents 40 of the two gravity separators. Each valve set 44 includes isolation double block and bleed valves, which enable the vessel to be isolated and fully depressurised when sand is being emptied through the outlet vent 38.

Within each gravity separator 34, the cylindrical vessel is divided into two chambers by a vertical wall 46 that extends from the upper end of the vessel downwards to just below mid-height. This wall 46 divides the vessel into an inlet portion below the inlet vent 40 and an outlet portion for liquid separated from the sand/liquid slurry. An outlet vent 48 for separated liquid is provided at the upper end of the outlet portion. The two liquid outlet vents are connected via valve sets 50 to a fluid flow line 52, which is connected to the liquid outlet line 30 downstream of the valve 32. Each valve set 50 again includes isolation double block and bleed valves, which enable the vessel to be isolated and fully depressurised when sand is being emptied through the outlet vent 38.

Each gravity separator also includes a number of side vents 54 with associated isolation valves, which allow water to be injected into the collected sand during emptying to agitate and dislodge the sand and allow it to flow more easily through the outlet vent 38. An inspection cover (not shown) may also be provided, allowing a tool to be inserted to break up any solidified accumulations of sand.

A sand level detector 56 is provided on each gravity separator to sense the level of sand collected within the vessel and provide a warning when the sand reaches a predetermined level, allowing an operator to switch delivery to the other gravity separator while the first gravity separator is emptied.

Each gravity separator includes an outlet vent 58, which allows the vessel to be depressurised prior to emptying, a pressure sensor 59, a sampling line 60 with associated double block and bleed valves, and a pressure relief valve 61 that prevents the vessel from being over-pressurised.

In use, a mixture of sand, gas and liquid is delivered through the inlet line 4 to the first separator 2, which separates gas at least partially from the mixture. In practice, although the bulk of the gas is removed, a small quantity of gas may remain in the form of bubbles within the separated sand/liquid mixture. The separated gas flows away through the gas outlet vent 6 and the gas line 20, while the sand/liquid mixture flows through the second outlet 8 to the inlet 24 of the cyclonic second separator 22. By removing the gas, the effects of changes in the flow regime and flow fluctuations are virtually eliminated, so that the flow rate of the sand/liquid mixture to the cyclonic second separator is much smoother and more even.

In the second separator 22, the bulk of the liquid is separated from the mixture of sand and liquid by cyclonic action. The separated liquid flows away through the liquid line 30, leaving a mixture of sand and liquid in the form of a slurry, in which the proportion of liquid to sand is much reduced. Some liquid is however carried through with the sand, which provides two major benefits:

a) it encourages the flow of sand into the gravity separator and prevents clogging of the delivery lines, and
b) it improves the efficiency of sand separation within the gravity separator, particularly for fine sand particles smaller than 50 microns which are difficult to separate in any cyclonic separation system.

The amount of liquid carried through with the sand can be adjusted by adjusting the tuning valve 32 on the liquid outlet line 26 of the cyclonic second separator 22 and the tuning valve on the liquid outlet line 52 of the gravity separators 34. The tuning valve 32 on the liquid outlet line 26 of the cyclonic second separator 22 also produces a small pressure drop, which allows the liquid returned from the gravity separators to be recombined more easily with the liquid from the cyclonic separator 22.

The sand/liquid slurry is delivered through the delivery lines 42 to one or other of the gravity separators 34, the valve sets 44 being operated so that the slurry is delivered alternately, first to one of the gravity separators and then to the other. While one of the gravity separators is receiving the sand/liquid slurry, the other is depressurised and the collected sand is released together with any remaining liquid into the sand collection container 39 for offsite cleaning and disposal.

The flow of sand/liquid slurry into the gravity separators 34 is assisted by locating the gravity separators 34 below the cyclonic second separator 22, so that the delivery lines 42 are substantially vertical. This helps to prevent clogging in the lines. As the slurry enters the gravity separator 34 it flows downwards on the inlet side of the dividing wall 46 and in the lower part of the vessel the sand separates from the liquid and settles to the bottom of the vessel, below the wall 46. The liquid meanwhile flows slowly upwards on the other side of the wall 46 towards the liquid outlet vent 48. The very low velocity of this return flow prevents sand particles larger than about 20 microns from being carried upwards out of the separator vessel. Very fine sand particles smaller than this do not cause significant damage and, as they remain in suspension within the flowing liquid, they do not accumulate and cause blockages.

Optionally, a filtering or mesh system 62 can be added to collect small sand particles in the range 10 to 50 microns. This system may be omitted if not required.

The invention claimed is:

1. A sand separation system including:
    a first separator that is constructed and arranged to receive a first mixture of gas, sand and liquid, and separate gas at least partially from the first mixture to leave a second mixture of sand and liquid,
    a second separator comprising a uniaxial cyclonic separator that is constructed and arranged to receive the second mixture and separate liquid at least partially from the second mixture to leave a third mixture of sand and liquid,
    and a third separator comprising a gravity separator that is constructed and arranged to receive the third mixture and separate liquid at least partially from the third mixture.

2. A sand separation system according to claim 1, wherein the first separator is a cyclonic separator.

3. A sand separation system according to claim 2, wherein the first separator is a uniaxial cyclonic separator.

4. A sand separation system according to claim 1, wherein the second separator includes an inlet chamber, a separation chamber and first and second outlet chambers.

5. A sand separation system according to claim 1, wherein the third separator includes a separation chamber having an inlet for the third mixture, an upper outlet for liquid and a lower outlet for sand, and a dividing wall in an upper part of the separation chamber, between the inlet and the upper outlet.

6. A sand separation system according to claim 1, wherein the third separator is located below the second separator.

7. A sand separation system according to claim 1, wherein the third separator includes a sand level detector.

8. A sand separation system according to claim 1, including means for isolating, depressurising and emptying the third separator.

9. A sand separation system according to claim 1, including a plurality of third separators that are constructed and arranged to receive the third mixture alternately.

10. A method of separating sand from a first mixture of sand, gas and liquid, the method including separating gas at least partially from the first mixture to leave a second mixture of sand and liquid, separating liquid at least partially from the second mixture by cyclonic action to leave a third mixture of sand and liquid, and separating liquid at least partially by gravity separation from the third mixture.

11. A method according to claim 10, including separating gas from the first mixture in a uniaxial cyclonic separator.

12. A method according to claim 10, including separating liquid from the second mixture in a uniaxial cyclonic separator.

13. A method according to claim 10, including delivering the third mixture alternately to a plurality of third separators.

14. A method according to claim 13, including isolating, depressurising and emptying each third separator between deliveries.

15. A method according to claim 11, including separating liquid from the second mixture in a uniaxial cyclonic separator.

16. A sand separation system according to claim 2, wherein the second separator includes an inlet chamber, a separation chamber and first and second outlet chambers.

17. A sand separation system according to claim 3, wherein the second separator includes an inlet chamber, a separation chamber and first and second outlet chambers.

18. A sand separation system according to claim 2, wherein the third separator includes a separation chamber having an inlet for the third mixture, an upper outlet for liquid and a lower outlet for sand, and a dividing wall in an upper part of the separation chamber, between the inlet and the upper outlet.

19. A sand separation system according to claim 3, wherein the third separator includes a separation chamber having an inlet for the third mixture, an upper outlet for liquid and a lower outlet for sand, and a dividing wall in an upper part of the separation chamber, between the inlet and the upper outlet.

20. A sand separation system according to claim 4, wherein the third separator includes a separation chamber having an inlet for the third mixture, an upper outlet for liquid and a lower outlet for sand, and a dividing wall in an upper part of the separation chamber, between the inlet and the upper outlet.

21. A sand separation system according to claim 2, wherein the third separator is located below the second separator.

* * * * *